(12) United States Patent
Ji

(10) Patent No.: US 10,814,845 B2
(45) Date of Patent: Oct. 27, 2020

(54) EMERGENCY BRAKING PREPARATION APPARATUS FOR VEHICLE

(71) Applicant: HYUNDAI MOBIS CO., LTD., Seoul (KR)

(72) Inventor: Yong Kwan Ji, Seoul (KR)

(73) Assignee: Hyundai Mobis Co., Ltd., Seoul (KR)

(*) Notice: Subject to any disclaimer, the term of this patent is extended or adjusted under 35 U.S.C. 154(b) by 238 days.

(21) Appl. No.: 16/043,156

(22) Filed: Jul. 24, 2018

(65) Prior Publication Data

US 2019/0031161 A1 Jan. 31, 2019

(30) Foreign Application Priority Data

Jul. 28, 2017 (KR) .................. 10-2017-0095854

(51) Int. Cl.
| | |
|---|---|
| B60T 8/174 | (2006.01) |
| B60W 10/184 | (2012.01) |
| B60W 10/30 | (2006.01) |
| B60W 30/09 | (2012.01) |
| B60T 8/32 | (2006.01) |
| B60T 8/171 | (2006.01) |
| G01S 13/931 | (2020.01) |
| B60Q 9/00 | (2006.01) |
| B60T 7/22 | (2006.01) |

(52) U.S. Cl.
CPC ............ *B60T 8/174* (2013.01); *B60Q 9/008* (2013.01); *B60T 7/22* (2013.01); *B60T 8/171* (2013.01); *B60T 8/321* (2013.01); *B60W 10/184* (2013.01); *B60W 10/30* (2013.01); *B60W 30/09* (2013.01); *G01S 13/931* (2013.01); *B60T 2201/022* (2013.01); *B60T 2201/03* (2013.01); *B60T 2210/10* (2013.01); *B60T 2210/32* (2013.01); *B60W 2510/182* (2013.01); *B60W 2552/00* (2020.02); *B60W 2554/00* (2020.02); *B60W 2554/80* (2020.02); *B60W 2555/20* (2020.02); *B60W 2710/182* (2013.01); *G01S 2013/932* (2020.01); *G01S 2013/93185* (2020.01)

(58) Field of Classification Search
CPC . B60T 8/174; B60T 7/22; B60T 8/171; B60T 8/321; B60Q 9/008
See application file for complete search history.

(56) References Cited

U.S. PATENT DOCUMENTS

2012/0162430 A1* 6/2012 Heslin .................... B60R 11/02
348/148

FOREIGN PATENT DOCUMENTS

KR 10-2012-0126152 11/2012

* cited by examiner

*Primary Examiner* — Michael D Lang
(74) *Attorney, Agent, or Firm* — H.C. Park & Associates

(57) ABSTRACT

An emergency braking preparation system for a vehicle may include: a vehicle detector configured to detect a vehicle speed; a driving road detector configured to detect the type of a driving road; a surrounding environment detector configured to detect a surrounding environment of the vehicle; an emergency braking controller configured to control a braking pressure of a brake to a preset braking state; and a controller configured to control an FOV of a camera according to one or more of the vehicle speed detected by the vehicle detection unit, the driving road detected by the driving road detection unit, and the surrounding environment detected by the surrounding environment detection unit, and control the emergency braking controller according to the FOV of the camera.

18 Claims, 4 Drawing Sheets

EMERGENCY BRAKING PREPARATION APPARATUS FOR VEHICLE

CROSS-REFERENCES TO RELATED APPLICATION

This application claims priority from and the benefit of Korean Patent Application No. 10-2017-0095854, filed on Jul. 28, 2017, which is incorporated by reference for all purposes as if set forth herein.

BACKGROUND

Field

Exemplary embodiments relate to an emergency braking preparation apparatus for a vehicle, and more particularly, to an emergency braking preparation apparatus for a vehicle, which adjusts a field of view (FOV) of a camera depending on the driving speed, driving road and driving environment of the vehicle, and controls a braking pressure in a stepwise manner based on the FOV.

Discussion of the Background

With the increasing demand for safety performance of vehicles, various types of safety devices have been recently mounted in the vehicles.

The safety devices may include an autonomous emergency braking (AEB) system.

The AEB system can determine whether sudden braking is required, and brake a vehicle during an emergency situation, thereby preventing a collision with another vehicle or pedestrian during driving. The AEB system is one of safety devices which the Euro-NCAP (European New Car Assessment Program) encourages users to mount.

In order to determine whether an emergency situation occurs or an obstacle is present in front of the vehicle, the AEB system needs to continuously monitor or observe the forward road of the vehicle during driving.

However, since a camera for observing the forward road has a predetermined FOV, it is difficult for the camera to maintain an appropriate observation range in various driving conditions.

Therefore, the FOV of the camera may be adjusted to maintain an appropriate observation range. In this case, however, since the FOV is adjusted in consideration of only the driving speed of the vehicle, a pedestrian may not be recognized.

The related art of the invention is disclosed in Korean Patent Publication No. 10-2012-0126152 published on Nov. 21, 2012 and entitled "Imaging device, imaging method and image information extraction device".

The above information disclosed in this Background section is only for enhancement of understanding of the background of the invention and, therefore, it may contain information that does not constitute prior art.

SUMMARY

Exemplary embodiments of the invention provide an emergency braking preparation apparatus for a vehicle, which adjusts an FOV of a camera depending on the driving speed, driving road and driving environment of the vehicle, and controls a braking pressure in a stepwise manner based on the FOV.

In one embodiment, an emergency braking preparation system for a vehicle may include: a vehicle detector configured to detect one or more speeds of other vehicles; a driving road detector configured to detect a type of a driving road; a surrounding environment detector configured to detect a surrounding environment of the vehicle; and a controller configured to change an FOV of a camera according to one or more speeds detected by the vehicle detector, the type of the driving road detected by the driving road detector, and/or the surrounding environment detected by the surrounding environment detector, and an emergency braking controller configured to control a braking pressure of a brake according to the FOV of the camera.

The controller may be configured to determine whether there is a traffic congestion and whether pedestrian information satisfies a predetermined pedestrian condition, based on numbers of moving objects and stationary objects detected by the surrounding environment detector, and to control the FOV of the camera according to one or more of the determined traffic congestion and pedestrian information conditions.

The controller may be configured to decrease the FOV of the camera when there is a traffic congestion and the pedestrian information satisfies the predetermined pedestrian condition.

The controller may be configured to increase the FOV of the camera when there is a traffic congestion and the pedestrian information does not satisfy the predetermined pedestrian condition.

When determining whether the pedestrian information satisfies the predetermined pedestrian condition, the controller may be configured to determine whether a number of pedestrians is equal to or more than a preset threshold value or an exposure time of the pedestrians is equal to or more than a preset threshold time.

The controller may be configured to determine whether there is a traffic congestion and the type of the driving road detected by the driving road detector is a high speed way, based on numbers of moving objects and stationary objects detected by the surrounding environment detector, and to control the FOV of the camera according to one or more of the determined traffic congestion and driving road conditions.

The controller may be configured to decrease the FOV of the camera when there is no traffic congestion and the type of the driving road is not a high speed way.

The controller may be configured to determine whether the driving road detected by the driving road detector is a high seed way, determines whether the one or more speeds detected by the vehicle speed detector is equal to or more than a predetermined threshold speed, and to control the FOV of the camera according to one or more of the determined type of driving road and vehicle speed conditions.

The controller may be configured to increase the FOV of the camera when the type of the driving road is a high speed way and the one or more speeds are equal to or more than the predetermined threshold speed.

The controller may be configured to decrease the FOV of the camera when the type of the driving road is a high speed way and the one or more speeds are less than the predetermined threshold speed.

The controller may be configured to control a braking pressure of the brake in a stepwise manner through the emergency braking controller, depending on whether the FOV of the camera is increased or decreased.

The emergency braking controller may include: a braking pressure state detector configured to detect the current braking pressure state of the brake; and a braking pressure adjuster configured to adjust the braking pressure of the brake in a stepwise manner, based on the current braking pressure state detected by the braking pressure state detector, according to a control signal of the controller.

When the FOV of the camera is decreased, the controller may be configured to control the braking pressure adjuster to increase the braking pressure of the brake.

After controlling the braking pressure adjuster to increase the braking pressure of the brake, the controller may be configured to calculate a collision risk based on the one or more speeds detected by the vehicle speed detector and the pedestrians detected by the surrounding situation detector, and control the braking pressure adjuster to additionally increase the braking pressure of the brake, depending on the calculated collision risk.

When the collision risk is equal to or more than a predetermined reference collision risk, the controller may be configured to control the braking pressure adjuster to additionally increase the braking pressure of the brake.

The controller may be configured to classify the pedestrians into children and adults and apply weights to the children and the adults, respectively, to calculate the collision risk, wherein the weight for the children is higher than the weight for the adults.

When the FOV of the camera is increased, the controller may be configured to control the braking pressure adjuster to decrease the braking pressure of the brake.

The emergency braking controller may further include an emergency braking monitor configured to output step-by-step warnings when a forward object appears ahead of the vehicle, and operate the brake when a driver does not press a brake pedal even after the step-by-step warnings were output, or when a time required for the driver to take an action when a forward object appears ahead of the vehicle without step-by-step warnings is shorter than a predetermined time.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
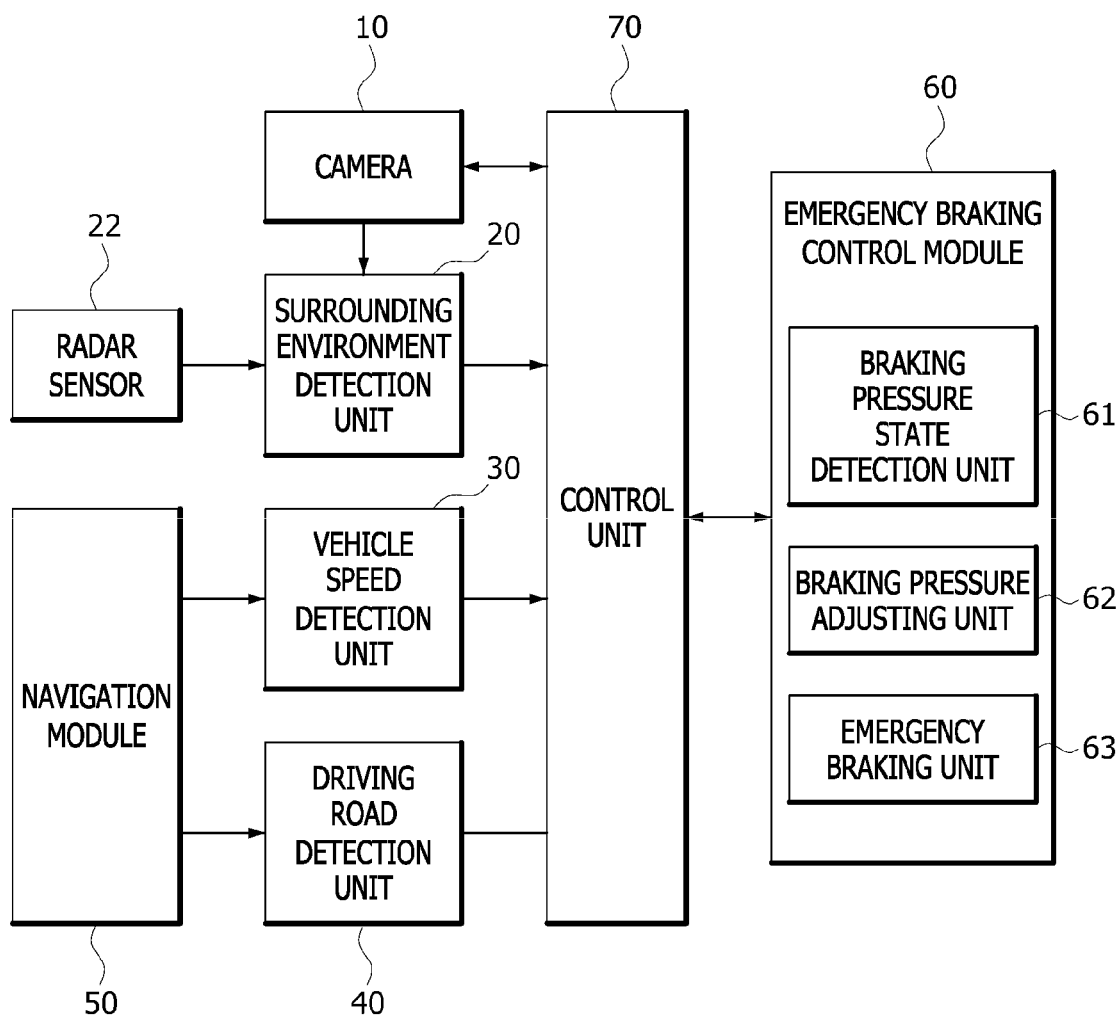
FIG. 1 is a block diagram illustrating an emergency braking preparation apparatus for a vehicle in accordance with an embodiment of the invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
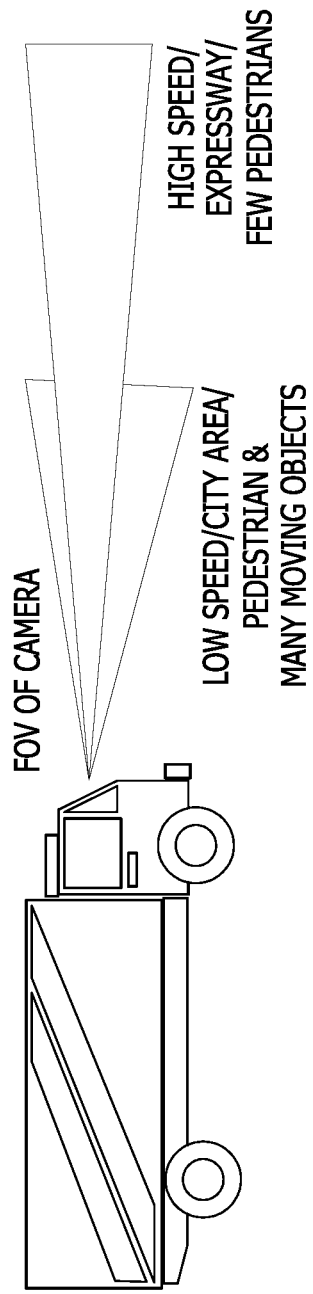
FIG. 2 schematically illustrates FOV control of a vehicle in accordance with the embodiment of the invention.
Figure 3:
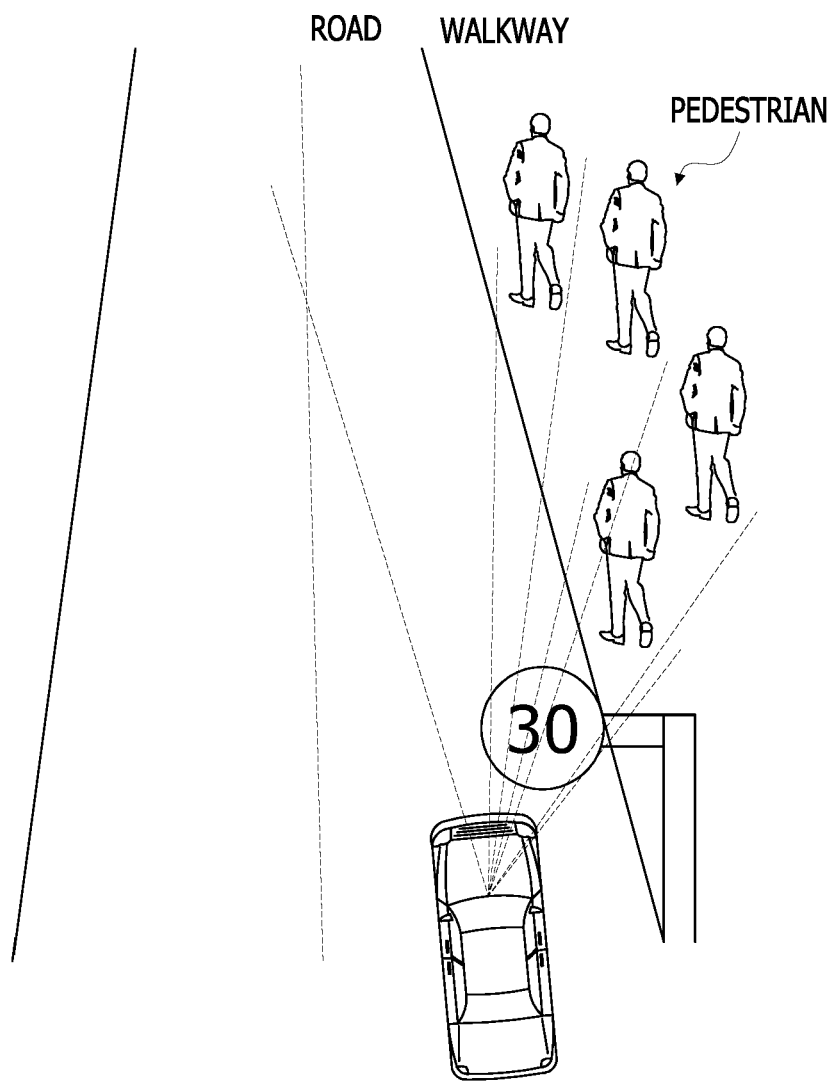
FIG. 3 illustrates a method for detecting pedestrian information around the road in accordance with the embodiment of the invention.

FIG. 1 is a block diagram illustrating an emergency braking preparation apparatus for a vehicle in accordance with an embodiment of the invention, FIG. 2 schematically illustrates FOV control of a vehicle in accordance with the embodiment of the invention, and FIG. 3 illustrates a method for detecting pedestrian information around the road in accordance with the embodiment of the invention.

Referring to FIG. 1, the emergency braking preparation apparatus for a vehicle in accordance with the embodiment of the invention may include a camera 10, a surrounding environment detection unit 20, a radar sensor 22, a vehicle speed detection unit 30, a driving road detection unit 40, a navigation module 50, an emergency braking control module 60 and a control unit 70.

The camera 10 may take an image of the forward road of the vehicle. Through the image taken by the camera 10, a forward object, a pedestrian and the like may be detected. The forward object may include a moving object and a stationary object. Furthermore, the forward object may include a forward vehicle, a traffic sign and a driving lane.

The camera 10 may have an FOV which is adjusted according to the driving speed, driving road and driving environment of the vehicle. This will be described later.

The surrounding environment detection unit 20 may detect the surrounding environment of the vehicle, for example, the number of pedestrians or forward objects from information detected through the camera 10 or the radar sensor 22.

For reference, the illustrated embodiment may be based on the supposition that the surrounding environment detection unit 20 detects the surrounding environment through the camera 10 or the radar sensor 22. However, the invention is not limited thereto, and various types of detection units may be employed as the surrounding environment detection unit 20, as long as the detection units can be mounted in the vehicle and detect a surrounding situation.

The vehicle speed detection unit 30 may detect the speed of the vehicle. The vehicle speed detection unit 30 may detect the vehicle speed through a vehicle speed sensor installed in the vehicle, but receive the vehicle speed from the navigation module 50.

The driving road detection unit 40 may detect the driving road on which the vehicle is driving. The driving road detection unit 40 may be connected to the navigation module 50, and detect the driving road on which the vehicle is driving, based on map information stored in the navigation module 50. In this case, the driving road detection unit 40 may detect the driving road through the navigation module 50 mounted in the vehicle. In addition, however, the driving road detection unit 40 may receive information on the driving road through a navigation server which is connected to the vehicle through wireless communication and provides various pieces of map information or route information.

The driving road detected through the driving road detection unit 40 may be classified into a high speed way and a general road. The high speed way may include an expressway and a high speed road in a city, and the general road may include a local road and a general road in a city.

The emergency braking control module 60 may control the braking pressure of the brake to a preset braking state in a stepwise manner, depending on the FOV of the camera 10.

The emergency braking control module 60 may include a braking pressure state detection unit 61, a braking pressure adjusting unit 62 and an emergency braking unit 63.

The braking pressure state detection unit 61 may detect the current braking pressure of the brake (not illustrated), for example, a brake fluid pressure or the like. At this time, under the supposition that the state in which the wheels of the vehicle are completely stopped so as not to rotate is set to a reference ratio of 100%, the braking pressure state detection unit 61 may convert the current braking pressure into the corresponding ratio.

The braking pressure adjusting unit 62 may adjust the braking pressure of the brake to the preset braking state, according to a control signal of the control unit 70. However, an actuator for adjusting the braking pressure may be changed depending on the braking method of the brake. Under the supposition that the state in which the wheels of the vehicle are completely stopped so as not to rotate is set to a reference ratio of 100%, the braking state may be divided into a plurality of levels. Thus, according to the control signal of the control unit 70, the braking pressure adjusting unit 62 may adjust the braking state to any one of the plurality of levels, based on the current braking pressure state.

When a driver does not take an action even though step-by-step warnings were outputted because an observed forward object or pedestrian appeared ahead of the vehicle, or when a time required for the driver to take an action in the case where a forward object appears ahead of the vehicle even though step-by-step warnings were not outputted is shorter than a designated time, for example, a statistical time required for the driver to step on the brake after recognizing a forward object or pedestrian, the emergency braking unit 63 may force the brake to be operated.

The control unit 70 may control the FOV of the camera 10 according to one or more of the vehicle speed detected by the vehicle speed detection unit 30, the driving road detected by the driving road detection unit 40, and the forward object detected by the surrounding environment detection unit 20, and control the emergency braking control module 60 to control the braking pressure of the brake to the preset braking state in a stepwise manner, depending on the FOV of the camera 10.

That is, the control unit 70 may increase or decrease the FOV of the camera 10 depending on each situation, based on the vehicle speed detected by the vehicle speed detection unit 30, the driving road detected by the driving road detection unit 40 and the forward object detected by the surrounding environment detection unit 20. Furthermore, the control unit 70 may control the emergency braking control module 60 to increase or decrease the braking pressure of the brake to the preset braking state in a stepwise manner.

More specifically, the control unit 70 may determine whether the driving situation is a traffic congestion, based on the numbers of moving objects and stationary objects which are detected by the forward object detection unit. When the determination result indicates that the driving situation is a traffic congestion, the control unit 70 may determine whether pedestrian information satisfies a preset pedestrian condition, and decrease or increase the FOV of the camera 10 according to the determination result. At this time, the control unit 70 may decrease the FOV of the camera 10 when the pedestrian information satisfies the pedestrian condition, and increase the FOV of the camera 10 when the pedestrian information does not satisfy the pedestrian condition.

In this case, when the number of moving objects detected by the surrounding environment detection unit 20 is equal to or more than a preset moving object threshold value or the number of stationary objects is equal to or more than a preset stationary object threshold value, the control unit 70 may determine that the driving situation is a traffic congestion.

Furthermore, when the number of pedestrians is equal to or more than a preset threshold value or the exposure time of the pedestrians is equal to or more than a preset threshold time, the control unit 70 may determine that the pedestrian condition is satisfied.

When an excessive number of pedestrians are included in one frame of an image, it is not easy to count the number of pedestrians within a short time, while a lot of load is consumed. The exposure time may include information indicating how many pedestrians are in a row on the walkway, without directly counting the number of pedestrians, when the pedestrians in the image are not separated, but overlap each other or stand close to each other. In other words, the exposure time may include the length information of pedestrians in a row, between whom the distance is shorter than a designated distance.

The control unit 70 may control the FOV of the camera 10 depending on whether the driving situation is a traffic congestion and whether the driving road detected by the driving road detection unit 40 is a high speed way. In this case, the control unit 70 may decrease the FOV of the camera 10 when the driving situation is not a traffic congestion and the driving road is not a high speed way.

Furthermore, when the driving situation is not a traffic congestion and the driving road is a high speed way, the control unit 70 may determine whether the vehicle speed detected by the vehicle speed detection unit 30 is equal to or more than a preset threshold speed, and control the FOV of the camera 10 according to the determination result. That is, the control unit 70 may increase the FOV of the camera 10 when the driving situation is not a traffic congestion, the driving road is a high speed way, and the vehicle speed is equal to or more than the threshold speed, and decrease the FOV of the camera 10 when the driving situation is not a traffic congestion, the driving road is a high speed way, and the vehicle speed is less than the threshold speed.

The threshold speed may indicate a reference speed for controlling the FOV of the camera 10. The reason why the control unit 70 controls the FOV of the camera 10 even though the driving road is a high speed way is that the vehicle speed may be reduced even though the driving road is a high speed way.

Depending on whether the FOV of the camera 10 is increased or decreased, the control unit 70 may control the braking pressure of the brake to a preset braking state in a stepwise manner through the emergency braking control module 60.

When the FOV of the camera 10 is decreased, the control unit 70 may control the braking pressure adjusting unit 62 to control the braking pressure of the brake to a preset braking state based on the current braking pressure. For example, the braking pressure adjusting unit 62 may increase the braking pressure by one level. On the other hand, when the FOV of the camera 10 is increased, the control unit 70 may control the braking pressure adjusting unit 62 to control the braking pressure of the brake to a preset braking state based on the current braking pressure. For example, the braking pressure adjusting unit 62 may decrease the braking pressure by one level.

After controlling the braking pressure adjusting unit 62 to increase the braking pressure of the brake to the preset braking state based on the current braking pressure, the control unit 70 may detect a collision risk based on the vehicle speed detected by the vehicle speed detection unit 30 and the forward object detected by the forward object detection unit, and control the braking pressure adjusting unit 62 to additionally increase the braking pressure of the brake, depending on the collision risk.

For example, when the collision risk is equal to or more than a preset reference collision risk, the control unit 70 may control the braking pressure adjusting unit 62 to additionally increase the braking pressure of the brake.

When calculating the collision risk, the control unit 70 may classify the pedestrians into children and adults, and apply weights to the children and the adults, respectively. At this time, the control unit 70 may apply a higher weight to the children than to the adults, such that the collision risk for the children is calculated as a higher value than the collision risk for the adults, even at the same distance, position or vehicle speed.

The control unit 70 may control the emergency braking unit 63 to output step-by-step warnings when a forward object or pedestrian appears ahead of the vehicle, and operate the brake when the driver does not press the brake pedal even after the step-by-step warnings were outputted, or when the time required for the driver to take an action in the case where a forward object appears ahead of the vehicle even though step-by-step warnings were not outputted is shorter than the designated time. Thus, the vehicle can be stopped even though the driver does not operate the brake in case of an emergency.

Hereafter, an emergency braking preparation method for a vehicle in accordance with the embodiment of the invention will be described in detail with reference to FIG. 4.

Figure 4:
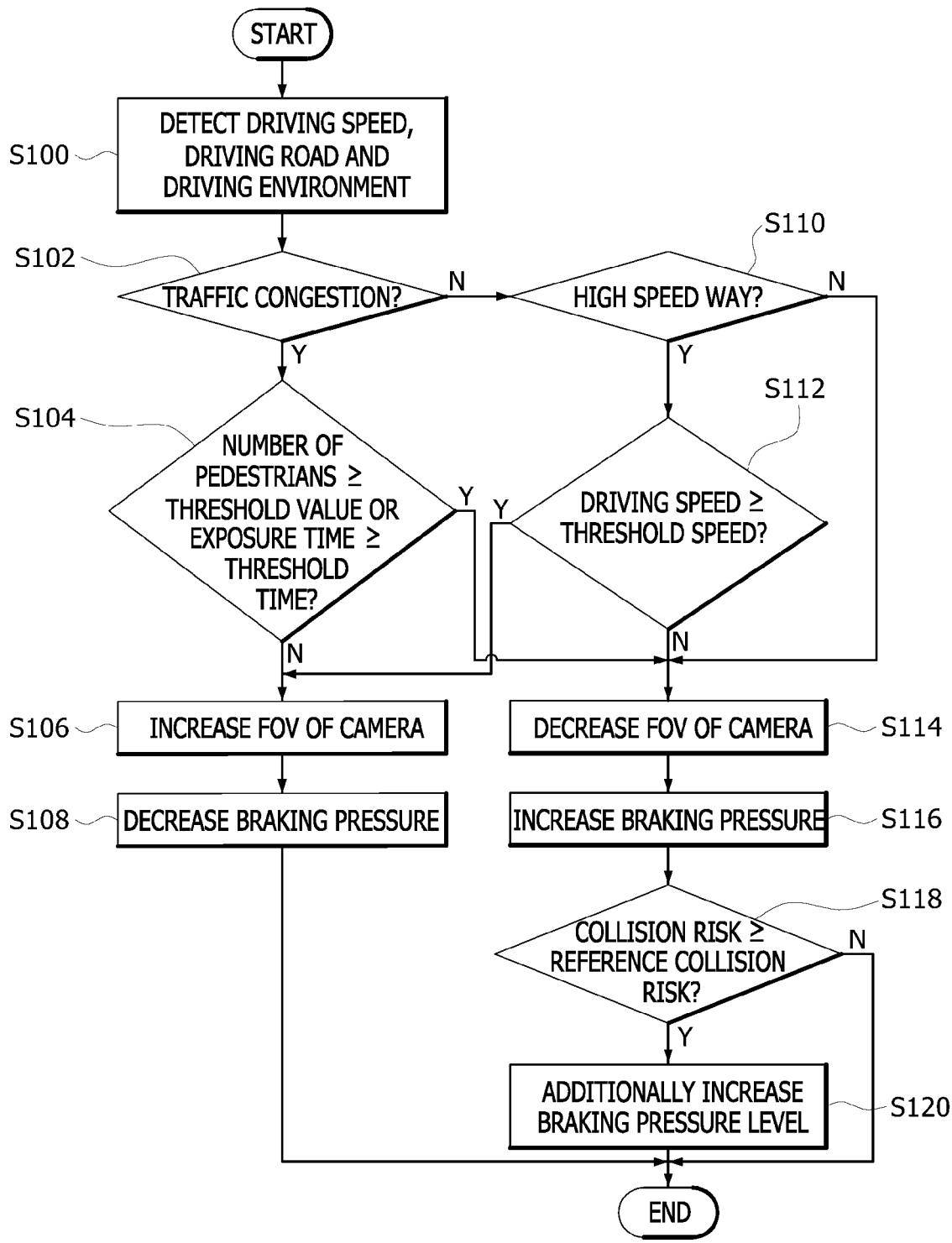
FIG. 4 is a flowchart illustrating an emergency braking preparation method for a vehicle in accordance with an embodiment of the invention.

FIG. 4 is a flowchart illustrating the emergency braking preparation method for a vehicle in accordance with the embodiment of the invention.

Referring to FIG. 4, the camera 10 may film the forward situation of the vehicle, the surrounding environment detection unit 20 may detect the surrounding environment of the vehicle, for example, the number of pedestrians or forward objects from information detected through the camera 10 or the radar sensor 22, and the vehicle speed detection unit 30 may detect the speed of the vehicle, at step S100.

As the driving speed, the driving road and the driving environment are detected, the control unit 70 may determine whether the driving situation is a traffic congestion, based on the numbers of moving objects and stationary objects which are detected by the forward object detection unit, at step S102. In this case, when the number of moving objects detected by the surrounding environment detection unit 20 is equal to or more than the preset moving object threshold value or the number of stationary objects is equal to or more than the preset stationary object threshold value, the control unit 70 may determine that the driving situation is a traffic congestion.

When the determination result of step S102 indicates that the driving situation is a traffic congestion, the control unit 70 may determine whether the pedestrian information satisfies the preset pedestrian condition, at step S104. In this case, when the number of pedestrians is equal to or more than the preset threshold value or an exposure time of the pedestrians is equal to or more than the preset threshold time, the control unit 70 may determine that the pedestrian condition is satisfied.

When the determination result of step S104 indicates that the pedestrian information satisfies the pedestrian condition, the control unit 70 may decrease the FOV of the camera 10 at step S114. On the other hand, when the determination result of step S104 indicates that the pedestrian information does not satisfy the pedestrian condition, the control unit 70 may increase the FOV of the camera 10 at step S106.

When the determination result of step S102 indicates that the driving situation is not a traffic congestion, the control unit 70 may determine whether the driving road is a high speed way, at step S110.

When the determination result of step S110 indicates that the driving road is not a high speed way but a general road, the control unit 70 may decrease the FOV of the camera 10 at step S114.

On the other hand, when the determination result of step S110 indicates that the driving road is a high speed way, the control unit 70 may determine whether the vehicle speed detected by the vehicle speed detection unit 30 is equal to or more than the preset threshold speed, at step S112. When the determination result of step S112 indicates that the vehicle speed is equal to or more than the threshold speed, the control unit 70 may increase the FOV of the camera 10 at step S106. On the other hand, when the determination result of step S112 indicates that the vehicle speed is less than the threshold speed, the control unit 70 may decrease the FOV of the camera 10 at step S114.

After decreasing the FOV of the camera 10 at step S114, the control unit 70 may control the braking pressure adjusting unit 62 to adjust the braking pressure of the brake to the preset braking state based on the current braking pressure, at step S116. For example, the braking pressure adjusting unit 62 may increase the braking pressure of the brake by one level.

After controlling the braking pressure adjusting unit 62 to increase the braking pressure to the preset braking state based on the current braking pressure, the control unit 70 may calculate a collision risk based on the vehicle speed detected by the vehicle speed detection unit 30 and the forward object detected by the forward object detection unit, and determine whether the calculated collision risk is equal to or more than the preset reference collision risk, at step S118. In this case, the control unit 70 may apply a higher weight to children than to adults, such that the collision risk for the children is calculated as a higher value than the collision risk for the adults, even at the same distance, position or vehicle speed.

When the determination result of step S118 indicates that the collision risk is equal to or more than the preset reference collision risk, the control unit 70 may control the braking pressure adjusting unit 62 to additionally increase the braking pressure of the brake, at step S120.

The control unit 70 may control the emergency braking unit 63 to output step-by-step warnings when a forward object or pedestrian appears ahead of the vehicle, and operate the brake when the driver does not press the brake pedal even after the step-by-step warnings were outputted, or when a time required for the driver to take an action in the case where a forward object appears ahead of the vehicle even though step-by-step warnings were not outputted is shorter than the designated action time. Thus, the vehicle can be stopped even though the driver does not operate the brake in case of an emergency.

After increasing the FOV of the camera 10 at step S106, the control unit 70 may control the braking pressure adjusting unit 62 to adjust the braking pressure of the brake to the preset braking state based on the current braking pressure, at step S108. For example, the braking pressure adjusting unit 62 may decrease the braking pressure of the brake by one level.

As described above, the emergency braking preparation apparatus for a vehicle in accordance with the embodiment of the invention can remove a limitation in FOV of the camera by adjusting the FOV of the camera according to the driving speed, the driving road and the driving environment of the vehicle. Then, the emergency braking preparation apparatus can control the braking pressure in a stepwise manner based on the FOV, thereby improving the performance of the emergency braking assistance system.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. An emergency braking preparation system for a vehicle, comprising:
   a vehicle detector to detect one or more speeds of other vehicles;
   a driving road detector to detect a type of a driving road;
   a surrounding environment detector to detect a surrounding environment of the vehicle;
   a controller to change a field of view (FOV) of a camera according to one or more speeds detected by the vehicle detector, the type of the driving road detected by the driving road detector, and/or the surrounding environment detected by the surrounding environment detector; and
   an emergency braking controller to control a braking pressure of a brake according to the FOV of the camera.

2. The emergency braking preparation system of claim 1, wherein the controller is operable to determine whether there is traffic congestion and whether pedestrian information satisfies a predetermined pedestrian condition, based on numbers of moving objects and stationary objects detected by the surrounding environment detector, and to control the FOV of the camera according to one or more of the determined traffic congestion and pedestrian information conditions.

3. The emergency braking preparation system of claim 2, wherein the controller is operable to decrease the FOV of the camera when there is a traffic congestion and the pedestrian information satisfies the predetermined pedestrian condition.

4. The emergency braking preparation system of claim 2, wherein the controller is operable to configured to increase the FOV of the camera when there is a traffic congestion and the pedestrian information does not satisfy the predetermined pedestrian condition.

5. The emergency braking preparation system of claim 2, wherein when determining whether the pedestrian information satisfies the predetermined pedestrian condition, the controller is operable to determine whether a number of pedestrians is equal to or more than a preset threshold value or an exposure time of the pedestrians is equal to or more than a preset threshold time.

6. The emergency braking preparation system of claim 1, wherein the controller is operable to determine whether there is a traffic congestion and whether the type of the driving road detected by the driving road detector is a high speed way, based on numbers of moving objects and stationary objects detected by the surrounding environment detector, and to control the FOV of the camera according to one or more of the determined traffic congestion and driving road conditions.

7. The emergency braking preparation system of claim 6, wherein the controller is operable to decrease the FOV of the camera when there is no traffic congestion and the type of the driving road is not a high speed way.

8. The emergency braking preparation system of claim 1, wherein the controller is operable to determine whether the type of the driving road detected by the driving road detector is a high speed way, to determine whether the one or more speeds detected by the vehicle speed detection unit are equal to or more than a predetermined threshold speed, and to control the FOV of the camera according to one or more of the determined type of driving road and vehicle speed conditions.

9. The emergency braking preparation system of claim 8, wherein the controller is operable to increase the FOV of the camera when the type of the driving road is a high speed way and the one or more speeds are equal to or more than the predetermined threshold speed.

10. The emergency braking preparation system of claim 8, wherein the controller is operable to decrease the FOV of the camera when the type of the driving road is a high speed way and the one or more speeds are less than the predetermined threshold speed.

11. The emergency braking preparation system of claim 1, wherein the controller is operable to control braking pressure of the brake in a stepwise manner through the emergency braking controller, depending on whether the FOV of the camera is increased or decreased.

12. The emergency braking preparation system of claim 11, wherein the emergency braking controller comprises:
    a braking pressure state detector to detect the current braking pressure state of the brake; and
    a braking pressure adjuster to adjust the braking pressure of the brake in a stepwise manner, based on the current braking pressure state detected by the braking pressure state detector, according to a control signal of the controller.

13. The emergency braking preparation system of claim 12, wherein when the FOV of the camera is decreased, the controller is operable to control the braking pressure adjuster to increase the braking pressure of the brake.

14. The emergency braking preparation system of claim 13, wherein after braking pressure adjuster increases the braking pressure of the brake, the controller is operable to calculate a collision risk based on the one or more speeds detected by the vehicle speed detector and the pedestrians detected by the surrounding environment detector, and to control the braking pressure adjuster to additionally increase the braking pressure of the brake, depending on the calculated collision risk.

15. The emergency braking preparation system of claim 14, wherein when the collision risk is equal to or more than a predetermined reference collision risk, the controller is operable to control the braking pressure adjuster to additionally increase the braking pressure of the brake.

16. The emergency braking preparation system of claim 14, wherein the controller is operable to classify the pedestrians into children and adults and apply weights to the children and the adults, respectively, to calculate the collision risk, wherein the weight for the children is higher than the weight for the adults.

17. The emergency braking preparation system of claim 12, wherein when the FOV of the camera is increased, the controller is operable to control the braking pressure adjuster to decrease the braking pressure of the brake.

18. The emergency braking preparation system of claim 12, wherein the emergency braking controller further comprises an emergency braking monitor to output step-by-step warnings when a forward object appears ahead of the vehicle, and to operate the brake when a driver does not press a brake pedal even after the step-by-step warnings were output, or when a time required for the driver to take an action when a forward object appears ahead of the vehicle without step-by-step warnings is shorter than a predetermined time.

* * * * *